(12) United States Patent
Klampfl

(10) Patent No.: US 11,518,011 B2
(45) Date of Patent: Dec. 6, 2022

(54) BICYCLE TOOL

(71) Applicant: Canyon Bicycles GmbH, Koblenz (DE)

(72) Inventor: Dominik Klampfl, Niederwerth (DE)

(73) Assignee: Canyon Bicycles GmbH, Koblenz (DE)

( * ) Notice: Subject to any disclaimer, the term of this patent is extended or adjusted under 35 U.S.C. 154(b) by 98 days.

(21) Appl. No.: 17/004,120

(22) Filed: Aug. 27, 2020

(65) Prior Publication Data
US 2021/0060744 A1 Mar. 4, 2021

(30) Foreign Application Priority Data

Aug. 28, 2019 (DE) ..................... 20 2019 104 721.6

(51) Int. Cl.
| | |
|---|---|
| B25B 27/00 | (2006.01) |
| B25B 15/04 | (2006.01) |
| B25B 23/00 | (2006.01) |
| B25G 1/08 | (2006.01) |
| B29C 73/06 | (2006.01) |
| B29L 30/00 | (2006.01) |

(52) U.S. Cl.
CPC .......... *B25B 27/0071* (2013.01); *B25B 15/04* (2013.01); *B25B 23/0035* (2013.01); *B25G 1/08* (2013.01); *B29C 73/06* (2013.01); *B29L 2030/00* (2013.01)

(58) Field of Classification Search
CPC . B25B 27/0071; B25B 15/04; B25B 23/0035; B25B 13/461; B25G 1/08; B29C 73/06; B29L 2030/00; B25F 1/00

USPC ............................................................ 7/165
See application file for complete search history.

(56) References Cited

U.S. PATENT DOCUMENTS

| | | | |
|---|---|---|---|
| 1,627,886 A * | 5/1927 | Cooley ................... | B25B 13/48 |
| | | | 7/138 |
| 9,194,385 B1 * | 11/2015 | Dooley ................... | B60C 25/02 |
| 2014/0298956 A1 | 10/2014 | Kerner | |
| 2017/0113338 A1 * | 4/2017 | Tien ........................ | B25B 21/00 |
| 2017/0157757 A1 | 6/2017 | Winefordner et al. | |
| 2018/0141396 A1 | 5/2018 | Kerner et al. | |
| 2018/0257205 A1 * | 9/2018 | Wood .................... | B25B 15/005 |
| 2019/0078561 A1 * | 3/2019 | Park ........................ | B60C 25/18 |

FOREIGN PATENT DOCUMENTS

| | | | | |
|---|---|---|---|---|
| DE | 102010016294 A1 * | 10/2011 | ............ | F04B 33/005 |
| DE | 102015104525 A1 * | 9/2016 | ......... | B25B 27/0071 |
| DE | 102015104525 A1 | 9/2016 | | |
| EP | 3453876 A1 | 3/2019 | | |
| WO | 9510426 A1 | 4/1995 | | |

OTHER PUBLICATIONS

DE102010016294 Translation (Year: 2022).*

* cited by examiner

*Primary Examiner* — Orlando E Aviles
*Assistant Examiner* — Jacob Adam Montgomery
(74) *Attorney, Agent, or Firm* — The Webb Law Firm

(57) ABSTRACT

A bicycle tool according to the disclosure comprises a valve connection means. A tool element is connected with the valve connection means. The tool element is connected with the valve connection means in its longitudinal direction such that an elongated bicycle tool is formed.

11 Claims, 5 Drawing Sheets

BICYCLE TOOL

CROSS-REFERENCE TO RELATED APPLICATION

This application claims priority to German Patent Application No. 20 2019 104 721.6 filed Aug. 28, 2019, the disclosure of which is hereby incorporated by reference in its entirety.

BACKGROUND OF THE INVENTION

Field of the Invention

The disclosure relates to a bicycle tool.

Description of Related Art

Besides bicycle tools which comprise various tools such as hex wrenches, open-end wrenches and the like through folding mechanisms, cyclists also often carry along further tools and repair kits. These are, for example, gas cartridges for quickly filling a bicycle inner tube after said bicycle inner tube has been changed. A further repair kit exists for tubeless tires in order to repair bigger holes which are not automatically closed by the sealing milk. Such a repair kit is offered under the name Dynaplug.

An object of the disclosure is to create a compact bicycle tool.

The object is achieved by a bicycle tool having the features of this disclosure.

SUMMARY OF THE INVENTION

The bicycle tool according to the disclosure comprises a valve connection means. Said valve connection means if preferably formed cylindrically, in particular circularly cylindrically, and is preferably provided with a suitable connection, in particular a thread, in order to be connectable with the valve of a bicycle tire for filling. The bicycle tool according to the disclosure further comprises a tool element. Said tool element is connected with the valve connection means in its longitudinal direction. The longitudinal direction of the valve connection means is the center line, in particular for a cylindrical valve connection means. By providing a tool element being connected in longitudinal direction with the valve connection means, a substantially elongated bicycle tool is realized. Such an elongated bicycle tool can be transported easily. For example, such a bicycle tool, which preferably has dimensions similar to a small bicycle pump being carried along, can be carried along easily in the shirt pocket. Such a bicycle tool according to the disclosure can also be arranged and carried along easily in holders for bicycle pumps usually provided in the area of drinking bottle holders. Furthermore, particularly for bicycle frames made of carbon or another corresponding material, it is possible that a storage compartment is provided in the top tube. In particular due to the elongated design of the bicycle tool according to the disclosure, said bicycle tool can be easily arranged in such a storage compartment which is particularly provided in the top tube of a bicycle frame.

The tool element preferably comprises a receiving space. Various tool can be received in the receiving space. It is particularly preferred that the receiving space is closable by a closing element, such as a cover, wherein the opening of the receiving space is preferably provided in longitudinal direction, that is at one of both ends of the tool element.

The closing element can preferably be connected with a tool. In this respect, it is possible to easily remove a tool being arranged for transport within the receiving space of the tool element by opening the receiving space. The closing element can also serve for easy handling of the tool connected therewith. It is particularly preferred that said tool is a repair mandrel. Such a repair mandrel is part of a repair kit for repairing bigger holes of a tubeless tire. Said repair mandrel is particularly part of a tool kit sold under the brand name Dynaplug.

In addition, it is preferred that the closing element is connected via a thread with the tool element. The receiving space of the tool element can thus also be opened or closed easily through the closing element.

In a particularly preferred development of the disclosure, the closing element is formed such that it comprises a connection element at a side facing the valve connection means for connecting the closing element with the valve connection means. In a preferred development said connection element is a thread. Thus, the closing element has several function. On the one hand, it serves, in particular by providing two connection elements being particularly formed as threads, for connecting the tool element with the valve connection means. It further has the function to carry a tool, such as a repair mandrel, in particular, and to be connected therewith, respectively, in order to simplify the handling of the corresponding tool. In a particularly preferred embodiment of the disclosure, the valve connection means is provided at the side facing the connection element such that the valve connection means can be connected with a bicycle valve. Said connection is preferably provided directly. In this respect, the valve connection means is preferably provided with an internal thread at the side facing the connection element such that the valve connection means can be directly screwed onto a bicycle valve. Optionally, an intermediate element, such as a tube, can be provided in order to connect the valve connection means of the bicycle tool according to the disclosure above the tube with the bicycle valve.

In addition, it is particularly preferred that the valve connection means comprises a receiving element at the side opposite the connection element. Said receiving element serves for connecting the valve connection means with a gas cartridge. In this respect, it is particularly preferred that the receiving element comprises an inner thread into which an outer thread can be screwed which is provided at the outlet of the gas cartridge. The receiving element is further preferably configured such that when screwing in the gas cartridge, said gas cartridge is opened.

The bicycle tool according to the disclosure can thus be used for repairing a hole in a tubeless tire, for example. For this purpose, the respective hole is first widened by means of the tire mandrel and a rubber plug or the like is inserted. This can be performed in particular according to the repair kit known under the brand name Dynaplug. The valve connection means is then directly screwed onto the bicycle valve or by interposing a connection tube. A carried along gad cartridge can then be easily screwed in at the opposite side of the valve connection means. Since the receiving element provided herein is preferably configured such that it is opened when screwing in the gas cartridge, an automatic filling of the repaired tubeless tire is performed.

As an alternative to the connection of the valve connection means with an inner thread being provided at the side of the valve connection means opposite the connection element, the connection of the gar cartridge is also possible at the side of the valve connection means on which the connection element is arranged. For this purpose, the connection element is first unscrewed and then the gas cartridge in screwed in. The opposite end, that is the end of the valve connection means opposite the cartridge, is directly or indirectly connected with the bicycle valve. Optionally, a corresponding tube can be provided for connection.

In a preferred development of the disclosure, the valve connection means comprises a cavity which in particularly arranged between the receiving element and the connection element. In said cavity, tools or, for example, plugs or the like of the repair kit can be stored.

In another preferred development of the bicycle tool according to the disclosure, the tool element comprises a tool holder. The tool holder is preferably provided at an end of the tool element facing away from the valve connection means. The tool holder preferably serves for receiving a tool, such as a bit or the like. In particular, the tool holder can be formed as a ratchet. It is particularly advantageous that due to the elongated design the bicycle tool according to the disclosure a good lever arm is provided. Particularly, if the tool element is connected with a tool and is additionally connected with the valve connection means, the valve connection means serves together with the tool element as a handle for operating the tool, in particular the ratchet. It is particularly preferred that the bit or another corresponding tool is kept in the mounted state in the tool holder in such a manner that a longitudinal axis of the bit or the like is arranged substantially perpendicular to a longitudinal axis of the valve connection means.

Preferably, the tool element is at least in the area of the receiving space cylindrically formed, in particular circularly cylindrically formed. This is followed by the area of the tool holder. Said area of the tool holder preferably does not protrude in the outer circumference beyond the outer dimensions of the tool element in the area of the receiving space.

In a development of the disclosure, a further tool element can be provided additionally. Said further tool element can be arranged between the valve connection means and the tool element and/or at a side of the valve connection means opposite the tool element. Particularly, the further tool element is optionally connected via a screw connection with the valve connection means and/or the tool element. Preferably, the further tool element is also cylindrically formed, in particular circularly cylindrically formed, and can comprise a further receiving space which serves for receiving one or more bits or the like, for example.

Furthermore, the disclosure relates to a bicycle tool kit. Said bicycle tool kit comprises a bicycle tool, as described above, and is particularly developed in an advantageous manner. The bicycle tool kit further comprises at least on gas cartridge in order to fill a bicycle tire easily by means of the valve connection means. This is independent of whether the bicycle tire has been repaired or patched previously with the repair mandrel or by other means. Optionally, the bicycle tool kit can also comprise a connection tube serving for connection of the valve connection means with the bicycle valve.

BRIEF DESCRIPTION OF THE DRAWINGS

In the following, the disclosure is described in detail by a preferred embodiment with reference to the attached figures in which.

DESCRIPTION OF THE INVENTION

Figure 1:
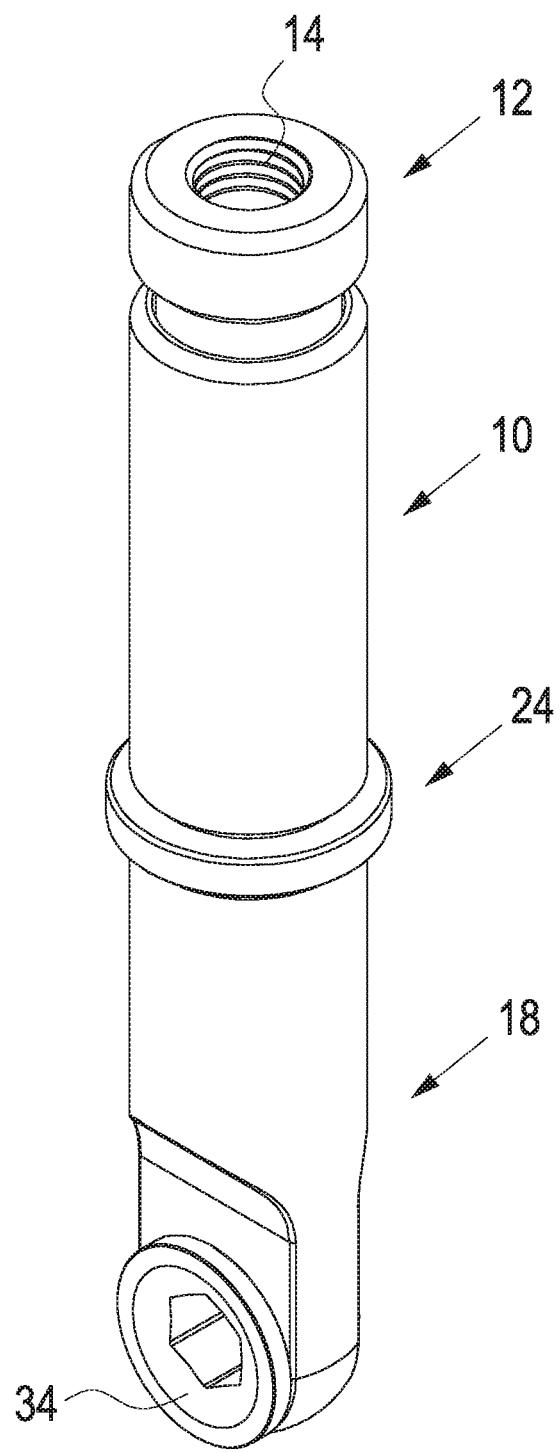
FIG. 1 shows a schematic perspective view of the bicycle tool in a closed state.

In the shown exemplary embodiment, the bicycle tool comprises a valve connection means 10. The valve connection means 10 comprises a thread 14 at its free end 12 in FIG. 1. Via thread 14, the valve connection means 10 can be connected with a bicycle valve which is not shown. Optionally, instead of a direct connection, an indirection connection through a tube can be established.

The bicycle tool according to the disclosure further comprises a tool element 18. The tool element 18 comprises a receiving space 20. In the area of receiving space 20, tool element 18 is circularly cylindrically formed in the shown exemplary embodiment. In the shown exemplary embodiment, the valve connection means 10 is further substantially formed circularly cylindrically.

In receiving space 20 of tool element 18, a tool 22 can be arranged. In the shown exemplary embodiment, tool 22 is a repair mandrel. Said repair mandrel can be arranged within receiving space 20 in case of a closed bicycle tool. The repair mandrel 22 is connected with a closing element 24. The closing element 24 comprises a lug 26 at the side at which repair mandrel 22 is also arranged. The lug 26 is provided with an outer thread. The outer thread can be screwed into an inner thread 28 which is arranged in the opening of receiving space 20 which is provided in longitudinal direction 30.

The tool element 18 comprises at one end 32 a tool holder 34, which is a ratchet in the shown exemplary embodiment. The tool holder 34 serves for receiving a tool, such as a bit 36.

Figure 2:
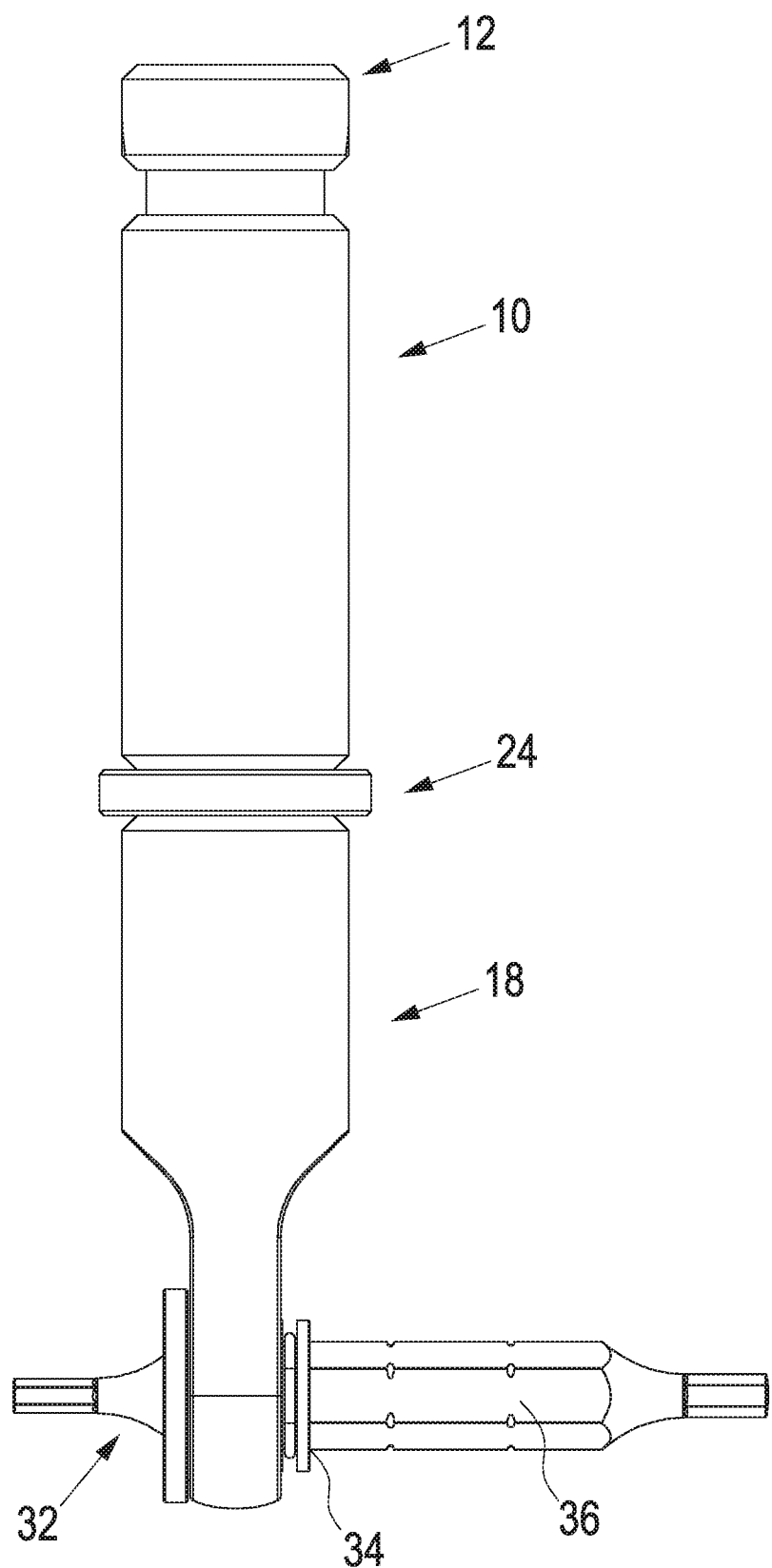
FIG. 2 shows a schematic perspective side view of the bicycle tool with inserted bit.
Figure 4:
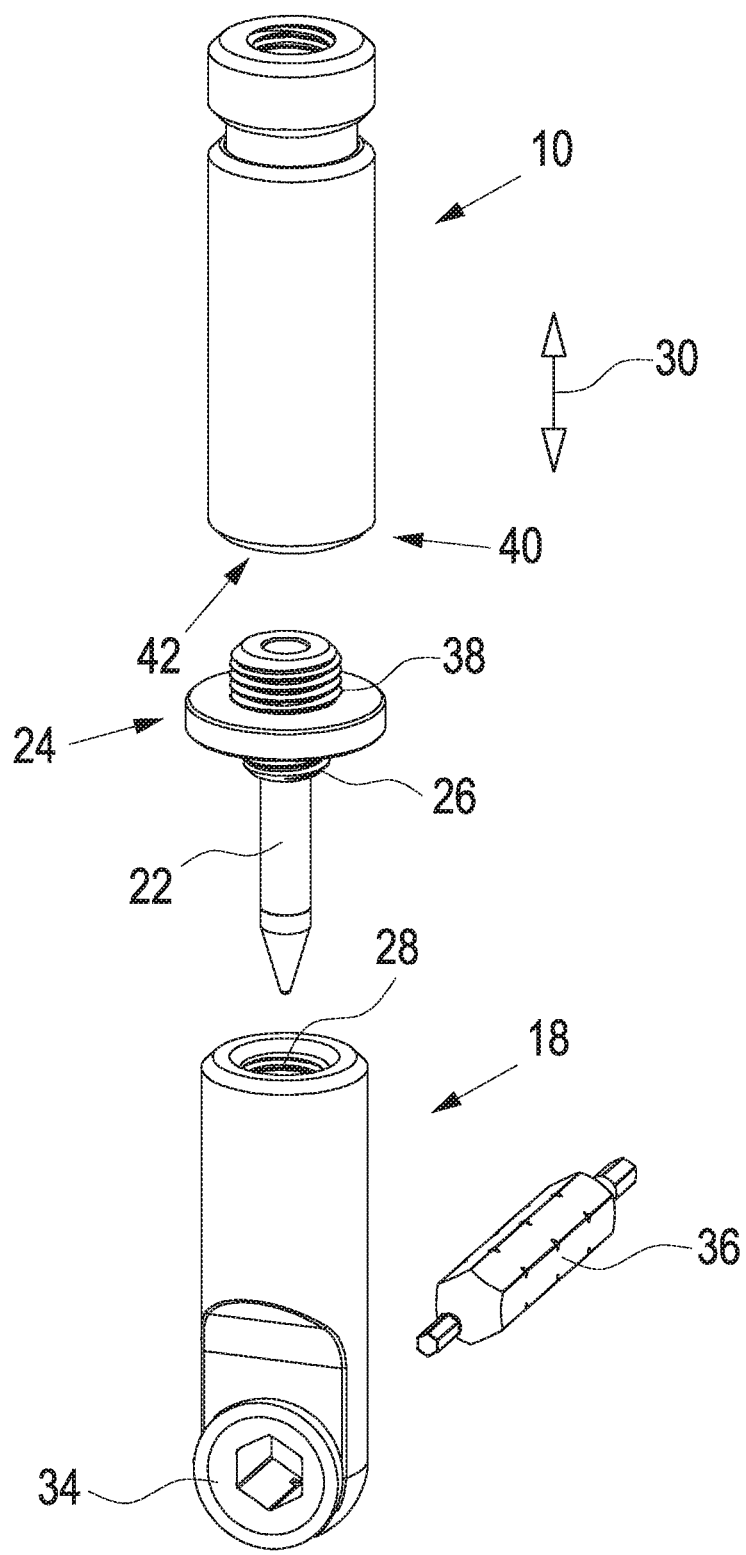
FIG. 4 shows a schematic component drawing of the essential components of the bicycle tool according to the disclosure.

For handling repair mandrel 22, said repair mandrel can be connected with the valve connection means 10. The connection is preferably established via a lug 38 (FIGS. 2 and 4) which is provided at closing element 24, wherein lug 38 is disposed opposite lug 26 and preferably also comprise a thread at is outer surface. The valve connection means 10 comprises at its end 40 facing closing element 24 a recess 42 with an inner thread into which lug 38 is screwable. The valve connection means 10 can comprise a cavity, for example, in order to receive repair material or a tool. The closed bicycle tool according to the disclosure (FIG. 2) comprises external dimensions similar to a small bicycle pump carried along with the bicycle. Particularly, the bicycle tool comprises, in a closed state, a length of less than 15 cm, in particular of less than 10 cm. The diameter or the external dimensions, respectively, are within the range of 10 to 22 mm.

Figure 5:
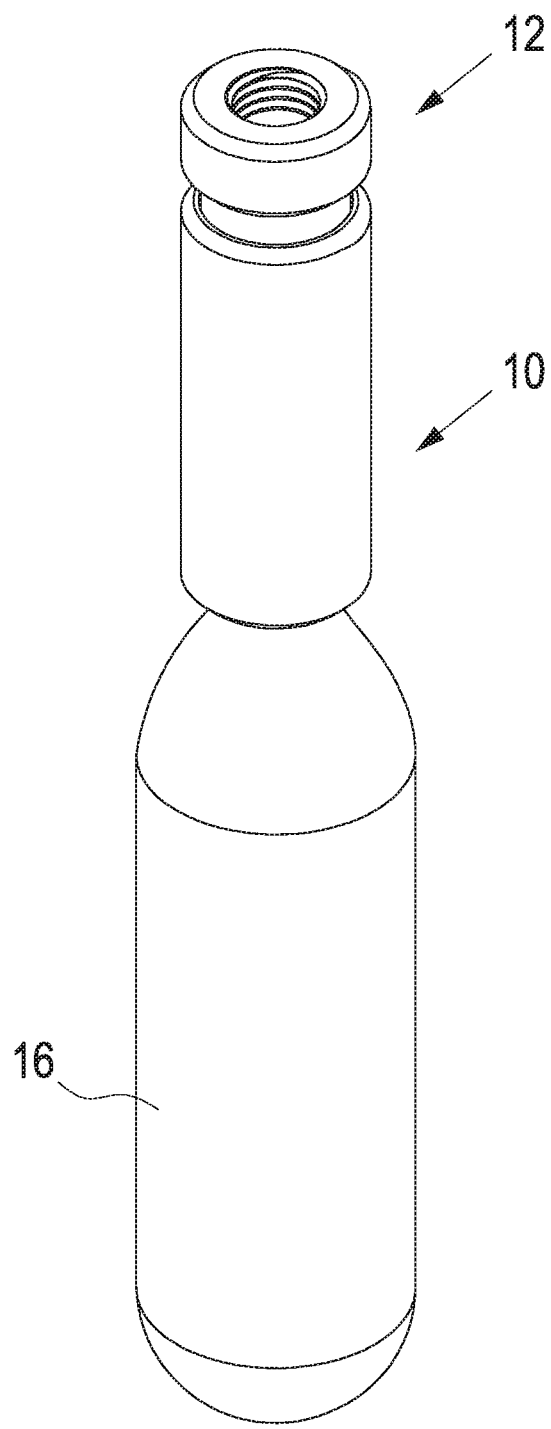
FIG. 5 shows a schematic perspective side view of the valve connection means of the bicycle tool together with a gas cartridge.

The bicycle tool according to the disclosure is also suitable for filling a bicycle tire which has been possibly patched or repaired initially by means of a repair mandrel 20 and corresponding repair material. For this purpose, the valve connection means 10 is screwed with the thread 14 onto the valve, wherein optionally a tube is interposed. The cartridge 16 is then screwed into inner thread 42 which is disposed opposite thread 14 (FIG. 5). In doing so, the cartridge is preferably automatically opened.

Figure 3:
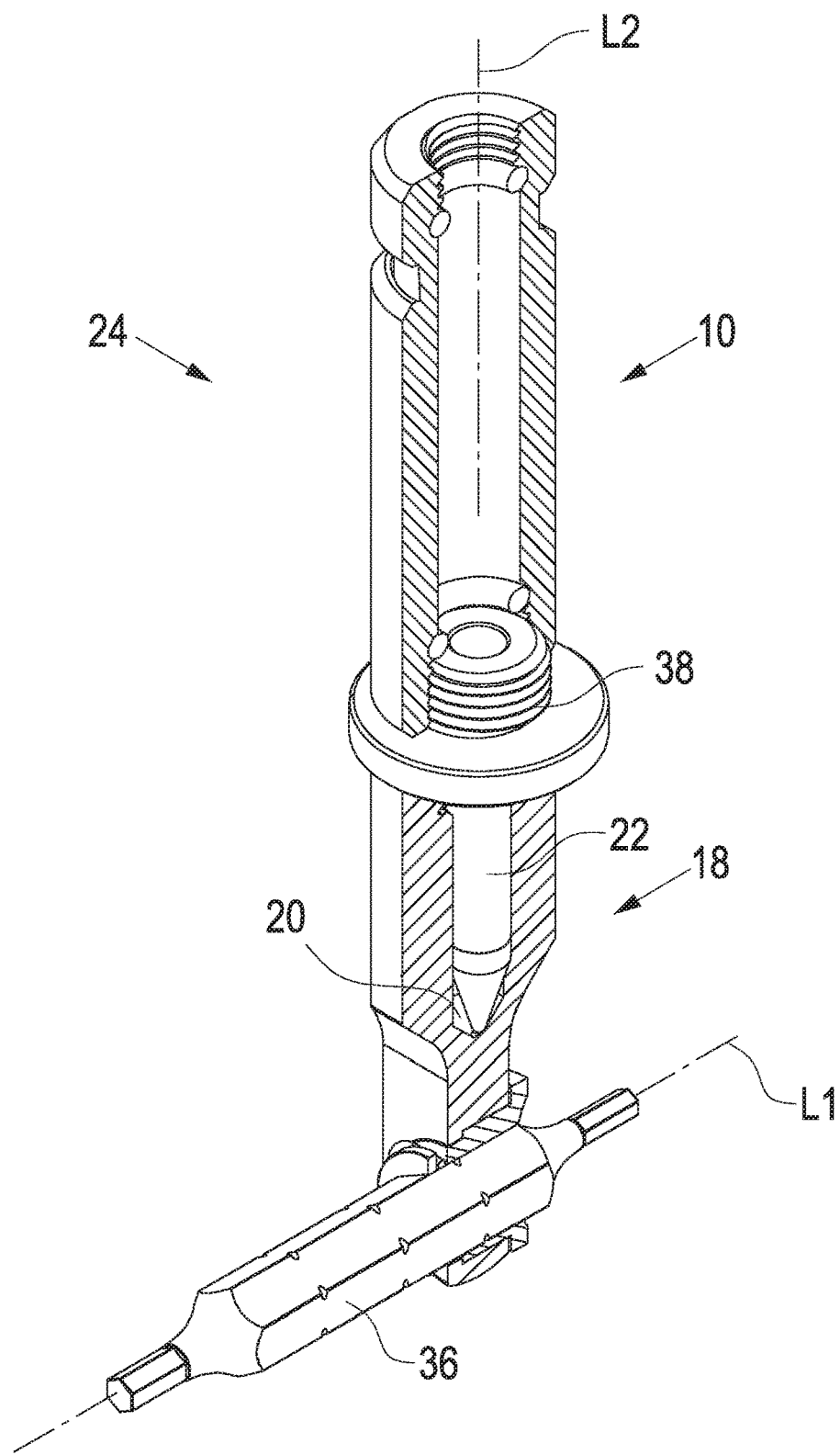
FIG. 3 shows a schematic longitudinal section of an embodiment of the bicycle tool according to the disclosure.

In a particularly preferred embodiment (FIG. 3), a longitudinal axis L1 of a bit 36 is substantially arranged perpendicular to a longitudinal axis L2 of the valve connection means 10.

The invention claimed is:

1. A bicycle tool, comprising
a valve connection means,
a tool element being connected with the valve connection means in its longitudinal direction, and
a closing element threadedly connected on a first end to the valve connection means, and on a second end, opposite the first end, to the tool element,
wherein the tool element comprises a tool holder at an end facing away from the valve connection means, and
wherein the tool holder comprises a through opening that is suitable for receiving a bit, wherein a longitudinal axis of the through opening of the tool holder extends perpendicular to a longitudinal axis of the valve connection means while the closing element is threadedly attached to both the valve connection means and the tool element.

2. The bicycle tool according to claim 1, wherein the tool element comprises a receiving space.

3. The bicycle tool according to claim 2, wherein the receiving space is closed by the closing element.

4. The bicycle tool according to claim 2, wherein the closing element is connected with a tool which is disposable in the receiving space.

5. The bicycle tool according to claim 1, wherein the closing element comprises a connection element at a side facing the valve connection means for connecting with the valve connection means.

6. The bicycle tool according to claim 5, wherein the valve connection means comprises an inner thread for connecting with the connection element, wherein the inner thread is configured such that it is screwable onto a bicycle valve or that a gas cartridge is screwable into the inner thread.

7. The bicycle tool according to claim 5, wherein the valve connection means comprises a receiving element at a side opposite the connection element for connecting with a bicycle valve or gas cartridge.

8. The bicycle tool according to claim 7, wherein the receiving element comprises an inner thread.

9. The bicycle tool according to claim 2, wherein the tool element is at least in the area of the receiving space formed cylindrically.

10. The bicycle tool according to claim 1, wherein a further tool element is provided between the valve connection means and the tool element or at a side of the valve connection means opposite the tool element, wherein the further tool element comprises a receiving space for tools.

11. A bicycle tool kit comprising a bicycle tool according to claim 1 and a gas cartridge.

* * * * *